United States Patent
Chang et al.

(10) Patent No.: US 7,562,324 B2
(45) Date of Patent: Jul. 14, 2009

(54) METHOD OF DESIGNING A SYNCHRONOUS CIRCUIT OF VLSI FOR CLOCK SKEW SCHEDULING AND OPTIMIZATION

(75) Inventors: Chao-Kai Chang, Taichung County (TW); Chia-Chi Chu, Tao-Yuan (TW); Wu-Shiung Feng, Tao-Yuan (TW)

(73) Assignee: Chang Gung University, Tao-Yuan (TW)

( * ) Notice: Subject to any disclaimer, the term of this patent is extended or adjusted under 35 U.S.C. 154(b) by 132 days.

(21) Appl. No.: 11/595,151

(22) Filed: Nov. 9, 2006

(65) Prior Publication Data
US 2008/0115098 A1 May 15, 2008

(51) Int. Cl.
*G06F 17/50* (2006.01)
(52) U.S. Cl. .................. 716/6; 716/1; 716/17
(58) Field of Classification Search ............ 716/1, 716/6, 17
See application file for complete search history.

(56) References Cited

OTHER PUBLICATIONS

Qing Zhu and Wayne W. M. Dai for "High-Speed Clock Network Sizing Optimization Based on Distributed RC and Lossy RLC Interconnect Models" in IEEE on Sep. 9, 1996.*

* cited by examiner

*Primary Examiner*—Thuan Do
(74) *Attorney, Agent, or Firm*—C. G. Mersereau; Nikolai & Mersereau, P.A.

(57) ABSTRACT

A method of designing a synchronous circuit of VLSI for Clock Skew scheduling and optimization is used to optimize the skew of a digital synchronous VLSI system and formulize the issue of skew optimization into the issue of quadratic equation programming. For estimation of reliability, a quadratic equation cost function is used to analyze an ideal value of skew and an error between feasible solutions. During operation, several algorithms are used to speed up the operation and lower the complexity, and ISCAS'89 is used as a testing circuit.

3 Claims, 12 Drawing Sheets

Spanning Tree Algorithm

```
static int fr[maxV];
#define P G → adj[v][w]
Void ST(Graph G, int st[], doublewt[])
  {int v, w, min;
  for (v = 0; v < G → V; v++)
    {st[v] = -1; fr[v] =v; wt[v] = maxWT;}
  st[0] = 0; wt[G → V] = maxWT;
  for (min = 0; min != G → V)
    {v = min; st[min] = fr[min];
    for (w = 0, min = G → V; w < G → V; w++)
      if(st[w] == -1)
        {if (P < wt[w])
          { wt[w] = P; fr[w] = v ;}
        if (wt[w] < wt[min]) min = w; }
}
}
```

FIG.10

A dummy program in a conjugate gradient method $x_0 = 0,\ r_0 = b,\ p_0 = r_0$ for n = 1, 2, 3...

$\alpha_n = \left(r_{n-1}^T r_{n-1}\right) / \left(p_{n-1}^T A_j\right)$  Distance for each time of iteration $x_n = x_{n-1} + \alpha_n p_{n-1}$  Solution to new iteration $r_n = r_{n-1} - \alpha_n A p_{n-1}$  Residual error $\beta_n = \left(r_n^T r_n\right) / \left(r_{n-1}^T r_{n-1}\right)$  Improved step $p_n = r_n + \beta_n p_{n-1}$  conjugate direction

FIG.11

METHOD OF DESIGNING A SYNCHRONOUS CIRCUIT OF VLSI FOR CLOCK SKEW SCHEDULING AND OPTIMIZATION

BACKGROUND OF THE INVENTION

1. Field of the Invention

This invention relates to optimization of the skew of a digital synchronous VLSI system and particularly to the acceleration of operation speed and the reduction of complexity.

2. Description of Related Art

Along with nano-technology that prevails, what is concerned in a high-performance integrated circuit design includes higher design complexity, high-speed clock frequency, lower interconnect width, and lower Supply Voltage, which increases the difficulty of high-performance integrated circuit design. Besides speed and surface area, reliability must be considered for the critical target of optimization.

A high-frequency digital synchronous VLSI circuit operates with a region assembly logic circuit, in this way, registers must be arranged in a specified region of the circuit and are controlled by clock signals; if the digital synchronous circuit is made to operate normally, the clock signals must be transmitted to each of the registers at different time of intervals, and thus the transmission of clock signals is implemented with the aspects of circuit and interconnect.

When a high-speed synchronous circuit gradually raise a clock frequency, the transmission of a clock signal in a Clock Distribution Network is a key point, which may raise clocks of a circuit and may be a feature required by the circuit for normal operation. How to effectively use clock variance for minimization of a clock cycle is a topic for discussion of clock variance scheduling and optimization. The time for the clock signal to reach a register must be corresponding to the limits of zero clocking and double clocking, and thus the circuit may work normally. The time for the clock signal to reach each register is not necessarily synchronous. Thus, effectively using the clock variance may not only make the circuit constantly operate normally but also raise the performance of circuit. Therefore, besides a conventional algorithm of clock variance scheduling and optimization, a conventional algorithm of polynomial time complexity is proposed. Due to the limit of clock cycle, results of multiple clock variation scheduling are given. In this invention, besides the optimization of clock variation scheduling, operation time is also taken seriously so that this invention is practicable.

SUMMARY OF THE INVENTION

In this invention, a quadratic equation cost function is mainly used to analyze an ideal value of skew and an error between feasible solutions. The depth first search algorithm, the minimum spanning tree, the concept of sparse matrix multiplication, and the Conjugate Gradients algorithm are used to speed up the operation and lower the complexity. Next, an ISCAS'89 is used as a testing circuit for outputting a simulation result. The methods proposed in this invention may make all the skews in the circuit reach to a target value. When circuit clocks may provide the circuit with correct running time, the reliability and performance of circuit increase.

DETAILED DESCRIPTION OF THE PREFERRED EMBODIMENTS

Now, the present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
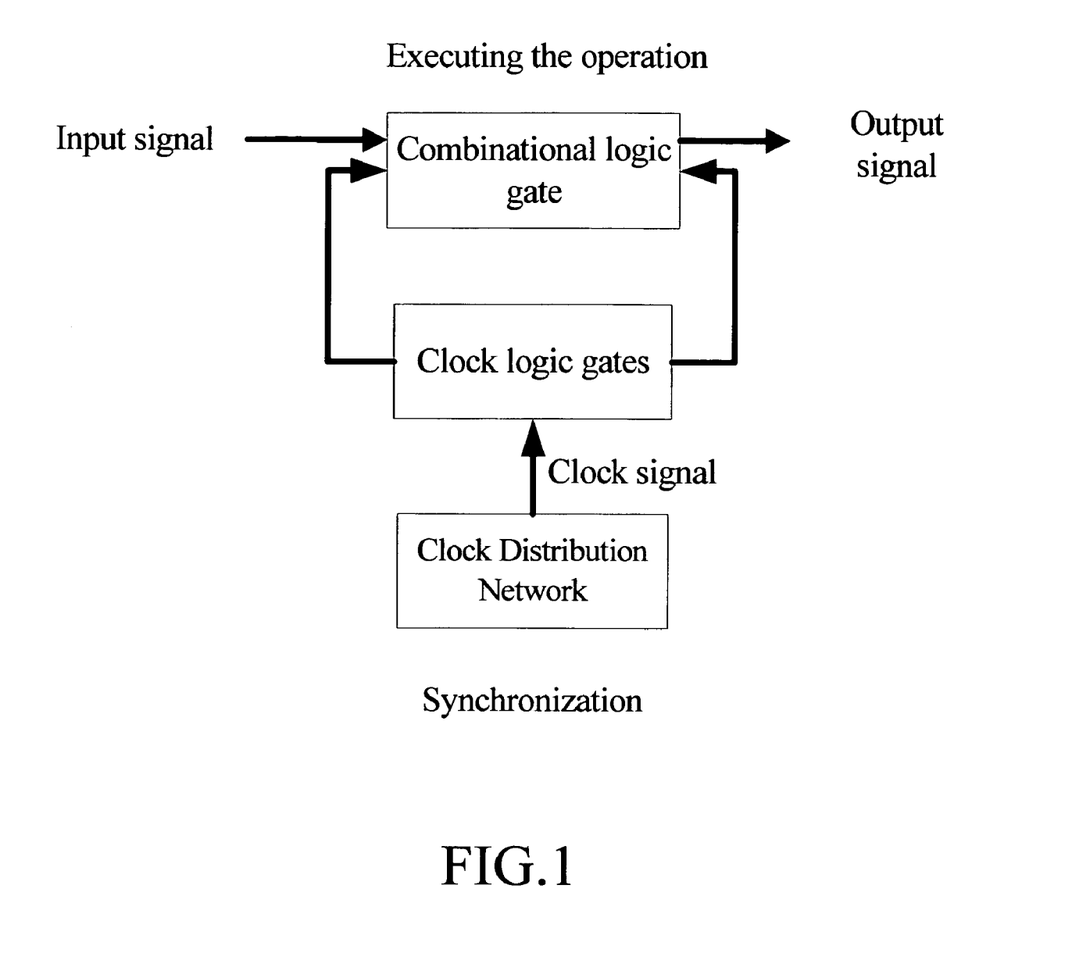
FIG. 1 is a flow chart of a synchronous system.

Generally speaking, a digital synchronous VLSI system proposed in a conventional technology comprises three elements:

1. combinational logic circuit, a primary circuit for a system to execute the operation, comprising several logic gates;
2. clock-based storage element that is made up with registers to store results given from the operation by the logic circuit;
3. Clock Distribution Network providing the input of clock-based storage element, which coordinates the synchronization of system by means of the control of time difference, the synchronous system being shown in FIG. 1.

Clock Skew and Security Range

Figure 2:
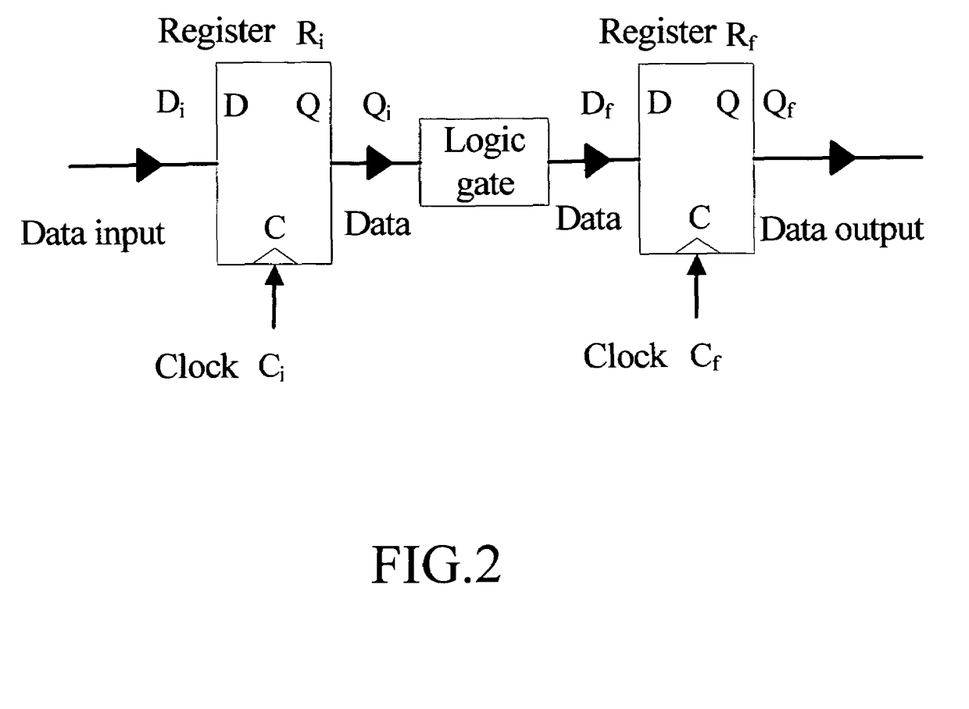
FIG. 2 is a flow chart of a local data path.

The combinational logic between the two registers adjacent in proper sequence to each other is called a local data path. FIG. 2 is a schematic view illustrating a local data path from a register $R_i$ to a register $R_f$, in which $C_i$ and $C_f$ represent clock input time of $R_i$ and $R_f$, respectively, and $D_{Pmin}^{i,f}$ and $D_{Pmax}^{i,f}$ indicate the minimum path delay and maximum path delay of the data path, respectively.

The risk of clock is caused by double clocking and zero clocking. The so-called skew means a value of difference of a clock input $R_i$ from that $R_i$ between the two registers $R_i$ and $R_j$ adjacent to each other, $$T_{Skew}(i,f) = C_i - C_f \qquad (1)$$

where the shift may cause the circuit to wrongly operate.

Double Clocking

Double clocking indicates that a data signal is triggered two times before a clock signal from a register is not registered. Thus, a first triggered data signal is neglected because of departure from hold time.

As shown in FIG. 2, when the data of a register $R_i$ is transmitted from an output terminal $Q_i$ in period k of clock signal $C_i$, and after the operation of combinational logic circuit, the data must be received from an input terminal $D_f$ of the register $R_f$ in period k+1 of clock signal $C_f$ for proper operation. However, if the signal received from the input terminal $R_f$ of register $R_f$ comes too early, the signal will be received from the input terminal $R_f$ of register $R_f$ in period k of clock signal $R_f$, and thus this signal covers the former signal, thereby making the circuit operate wrongly. Thus, a time limit must be applied to the signal received from the input terminal $R_f$ of register $R_f$ for the proper operation of the circuit:

$$t_{Am}^{Ff} \geq (C_f + kT_{Cp} + \Delta_L^F) + \delta_H^{Ff} \quad (2)$$

where $t_{Am}^{Ff}$ is the minimum time for the signal to reach the input terminal $D_f$ of register $R_f$, $T_{CP}$ is a period of clock signal, $\Delta_L^F$ is a tolerant error of the clock signal, and $\delta_H^{Ff}$ is the hold time of register $R_f$.

$t_{Am}^{Ff}$ is made up with two sets of time that may be divided, the output time of a former register $R_i$ and the transfer time of combinational logic circuit:

$$t_{Am}^{Ff} = t_{Qm}^{Fi} + D_{Pm}^{i,f} \quad (3)$$

where $t_{Qm}^{Fi} = C_i + kT_{CP} - \Delta_L^F + D_{CQm}^{Fi}$ gives the time of output terminal $Q_i$ of the data register $R_i$, and $D_{Pm}^{i,f}$ is a minimum value of the transfer time of combinational logic circuit between the registers $R_i$ and $R_f$. Thus, equation (2) may be changed into:

$$(C_i + kT_{CP} - \Delta_L^F + D_{CQm}^{Fi}) + D_{Pm}^{i,f} \geq (C_f + kt_{CP} + \Delta_L^F) + \delta_H^{Ff} \quad (4)$$

After it is simplified, an equation is given below:

$$T_{Skew}(i,f) \geq -(D_{Pm}^{i,f} + D_{CQm}^{Fi}) + \delta_H^{Ff} + 2\Delta_L^F \quad (5)$$

Equation (5) is given from double clocking, and thus it is deduced that the minimum limit must be applied to the skew between the registers $R_i$ and $R_j$. From the above description, no clock period is given in equation (5), so equation (5) is not related to the clock period. Therefore, when the double clocking is caused in the circuit, raising the clock period is not helpful. It is apparent that the double clocking is more dangerous; namely, the clock risk in the circuit is almost caused by the departure from hold time.

Zero Clocking

Zero clocking indicates that a clock signal has been triggered before a data signal does not reach a register; thus, the register transmits an erroneous value mainly due to the departure from built-up time.

As shown in FIG. 2, if the signal received from the input terminal $R_f$ of register $R_f$ comes too late, the signal will not be received from the input terminal $R_f$ of register $R_f$ in period k+1 of clock signal $R_f$, and no signal is inputted to the register $R_f$, likewise making the circuit operate wrongly. Thus, a time limit must be applied to the signal received from the input terminal $R_f$ of register $R_f$ for the proper operation of the circuit:

$$t_{AM}^{Ff} \leq (C_f + (k+1)T_{CP} - \Delta_L^F) - \delta_S^{Ff} \quad (6)$$

where $t_{AM}^{Ff}$ is the maximum time for the signal to reach the input terminal $t_{AM}^{Ff}$ of register $t_{AM}^{Ff}$, $t_{AM}^{Ff}$ is a period of clock signal, $t_{AM}^{Ff}$ is a tolerant error of the clock signal, and $t_{AM}^{Ff}$ is the built-up time of register $t_{AM}^{Ff}$.

$t_{AM}^{Ff}$ may be made up with two sets of time:

$$t_{AM}^{Ff} = t_{QM}^{Fi} + D_{PM}^{i,f} \quad (7)$$

where $t_{QM}^{Fi} = C_i + kT_{CP} + \Delta_L^F + D_{CQM}^{Fi}$ gives the time of output terminal $t_{QM}^{Fi} = C_i + kT_{CP} + \Delta_L^F + D_{CQM}^{Fi}$ of the data register $t_{QM}^{Fi} = C_i + kT_{CP} + \Delta_L^F + D_{CQM}^{Fi}$, and $t_{QM}^{Fi} = C_i + kT_{CP} + \Delta_L^F + D_{CQM}^{Fi}$ is a maximum value of the transfer time of combinational logic circuit between the registers $t_{QM}^{Fi} = C_i + kT_{CP} + \Delta_L^F + D_{CQM}^{Fi}$ and $t_{QM}^{Fi} = C_i + kT_{CP} + \Delta_L^F + D_{CQM}^{Fi}$. Thus, equation (6) may be changed into:

$$(C_i + kT_{CP} + \Delta_L^F + D_{CQM}^{Fi}) + D_{PM}^{i,f} \leq (C_f + (k+1)T_{CP} - \Delta_L^F) - \delta_S^{Ff} \quad (8)$$

After it is simplified, an equation is given below:

$$T_{Skew}(i,f) \leq T_{CP} - (D_{PM}^{i,f} + D_{CQM}^{Fi} + \delta_S^{Ff}) - 2\Delta_L^F \quad (9)$$

Equation (9) is given from zero clocking, and thus it is deduced that the maximum limit must be applied to the skew between the registers $R_i$ and $R_j$. From equation (9), two critical results may be known:

1. The clock period may be adjusted to avoid the clock risk caused by zero clocking; thus, proper exaltation of the clock period may increase an upper limit of the skew, the flexibility of skew.
2. The clock period $T_{CP}$ is not necessarily higher than $(D_{PM}^{i,f} + D_{CQM}^{Fi} + \delta_S^{Ff})$ because a value given from the clock shift may be positive and also negative, and thus, in equation (9), at this time of $T_{CP} - (D_{PM}^{i,f} + D_{CQM}^{Fi} + \delta_S^{Ff}) < 0$, only under the condition of clock shift $T_{Skew}(i, f) < 0$, zero clocking will not be caused in the local path.

In the design of synchronous circuit, it is assumed that all the registers are triggered at the same time; namely, it is a so-called target to zero skew. In fact, the time for the clock signal to reach the register must be corresponding to the limits of zero clocking and double clocking, and thus the circuit may work normally. Thus, the skew must be in a permissible range and thus the local data path may work safely.

Scheduling and Optimization of the Clock Skew

Figure 3:
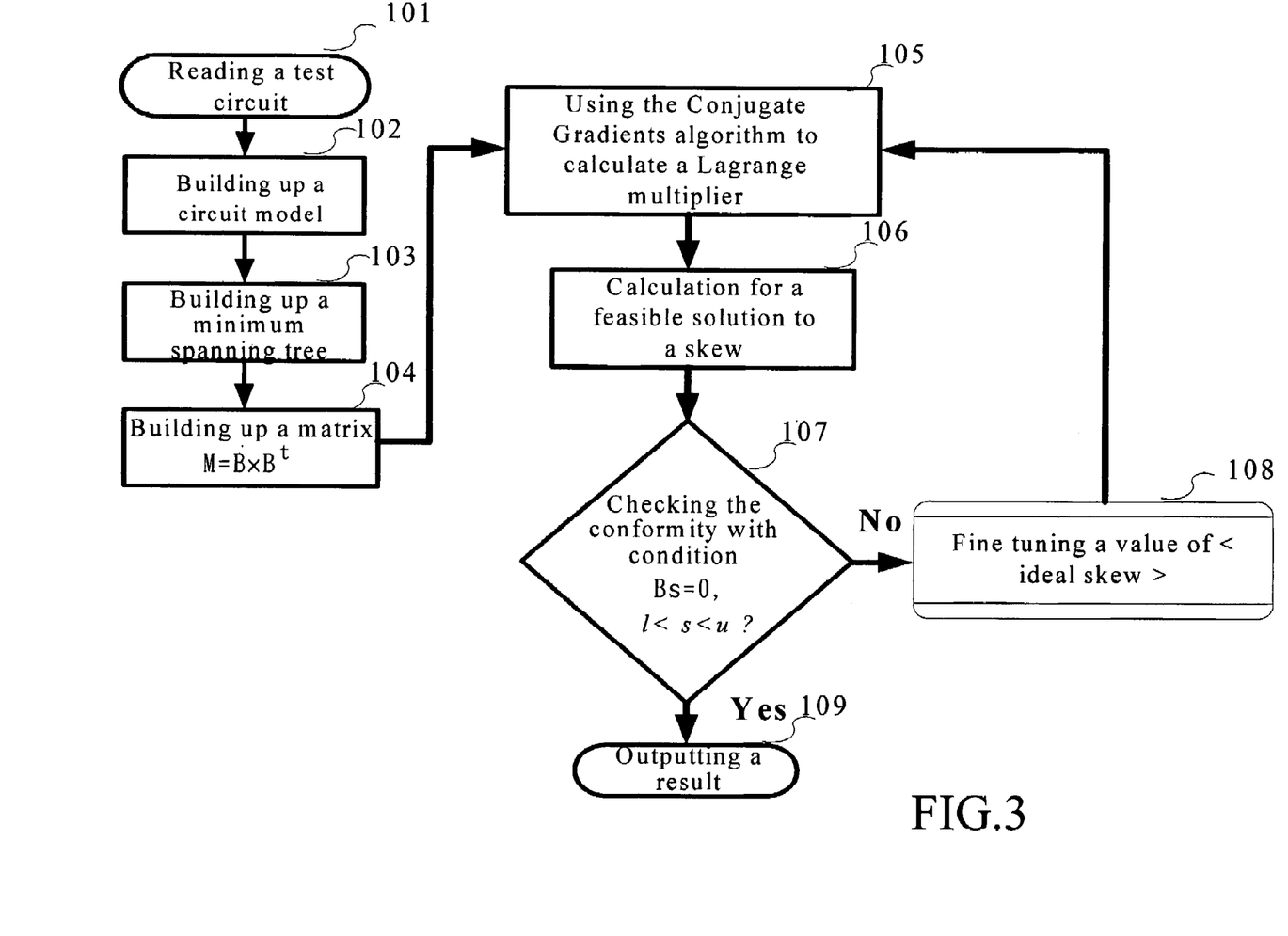
FIG. 3 is a flow chart of the program according to this invention.

After the safe range of skew in the local data path is defined, the skew scheduling and optimization is implemented. As shown in FIG. 3 illustrating a flow chart of execution of a program according to this invention, at step 1 of reading a test circuit 101, a circuit to be tested is first read in the program;

at step 2 of building up a circuit model 102, before optimization, pre-processing of and correlation analysis on the circuit, including establishment of the circuit model and linear-related analysis on the model must be carried out through step 102;

at step 3 of building up a minimum spanning tree 103, a minimum spanning tree is built up;

at step 4 of building up a matrix $M=B \times B^t$ 104, a matrix $M=B \times B^t$ is built up;

at step 5 of calculating a Lagrange multiplier 105, a Conjugate Gradients algorithm is used to calculate a Lagrange multiplier;

at step 6 of calculation for a feasible solution to skew, calculation is done for a feasible solution to skew;

at step 7 of checking the conformity with condition 107, the condition is checked for the conformity with condition Bs=0, l<s<u;

at step of fine tuning a value of <ideal skew> 108, if the condition does not meet the condition set at step 7, a value of <ideal skew> fine tuned, and step 5 returns;

at step of outputting a result 109, if the condition meets the condition set at step 7, a result is outputted.

Construction of a Circuit Model

Figure 4A:
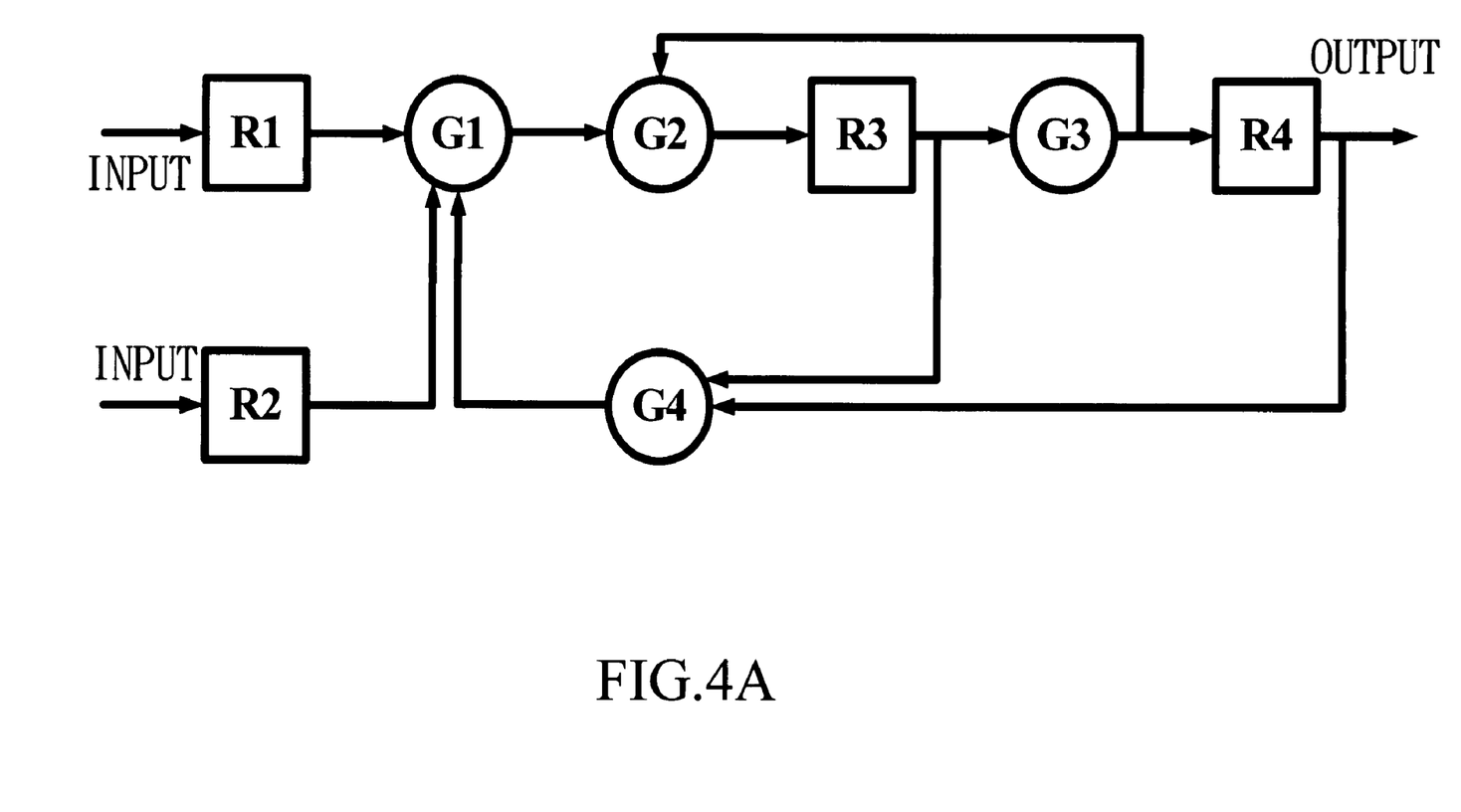
FIG. 4A is a digital synchronous circuit diagram.
Figure 4B:
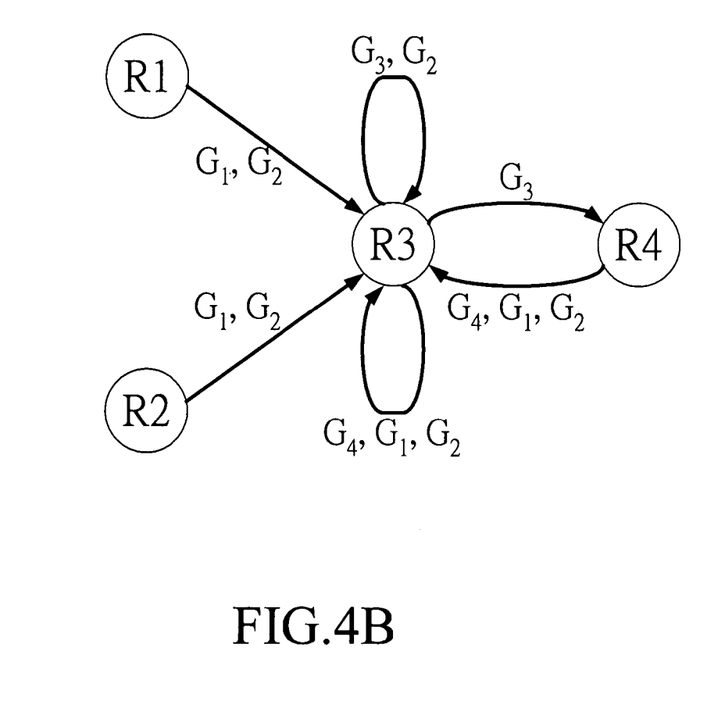
FIG. 4B is a simplified digital synchronous circuit diagram.
Figure 4C:
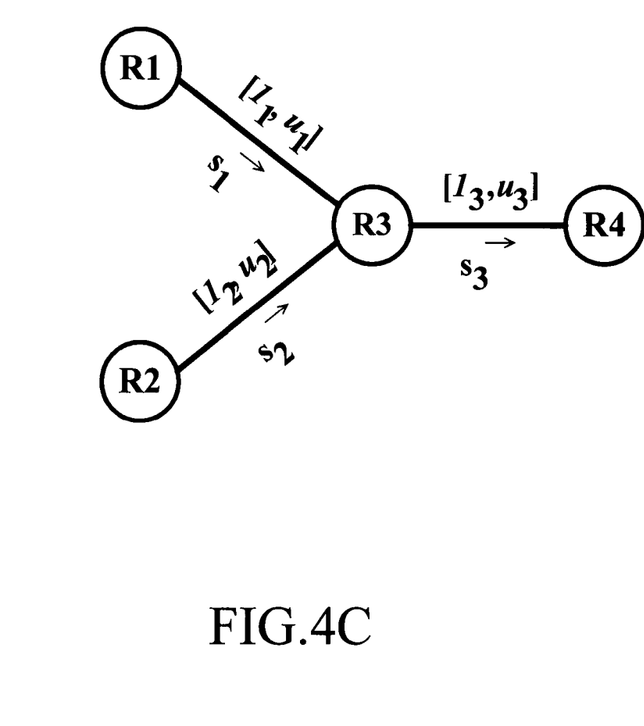
FIG. 4C is a view of a result given from the modeling of circuit.

A digital VLSI circuit comprises many combinational logic circuits and registers, and a simple digital synchronous circuit, as shown in FIG. 4A, comprises four registers R1, R2, R3, and R4 and four logic gates G1, G2, G3, and G4. The skew between registers is a main issue, and thus after the circuit is simplified, only types of registers connecting with each other remains, as shown in FIG. 4B, in a graphics theory based on a conventional technology. Next, the registers are disconnected for prevention of the skew. Finally, $[l_i, u_i]$ is used as a value in a safe range of each period of skew and $[l_i, u_i]$ is used as a mark of each period of link. $s_i$ comprises a skew value and link-up direction of the data path, as shown in FIG. 4C.

There is almost only a path (local data path) between registers adjacent to each other, but there might be more than two connections of registers adjacent to each other. At this time, another processing manner is divided into two conditions: a first condition when the direction of connections are the same, maximum and minimum values in the safe range of skew of each connection must intersect: $\cap \lfloor l_{z(i)}, u_{z(i)} \rfloor$; a second condition when the direction of connections are opposite, a direction must be set to a last direction, and when the direction of connections is different from that specified, the maximum and minimum values in the safe range of skew are exchanged and marked with a negative sign and finally intersect the safe range of skew in each period of connection: $\cap \lfloor l_{z(i)}, u_{z(i)} \rfloor$.

Linear Dependence of the Clock Skew

Figure 5:
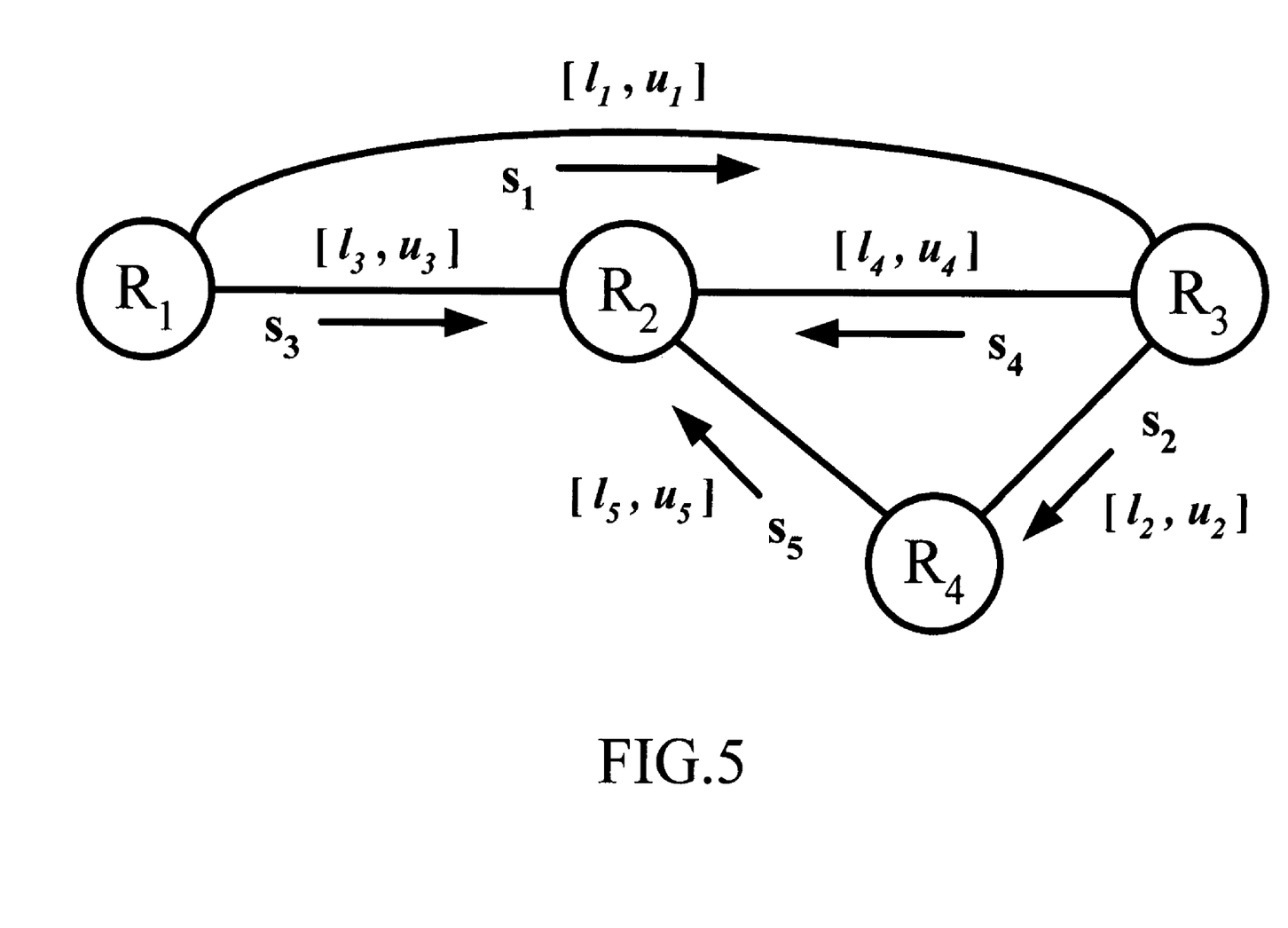
FIG. 5 shows a circuit diagram illustrating the clock skew.

Generally, a large circuit comprises very many feedback feedforeward data paths. As shown in FIG. 5, the sets of skew $s_4$ and $s_4$ are equal, $s_4=s_4$, because of the path from a register $s_4$ finally to a register $s_4$. The correlated data paths may form a loop, and in FIG. 5, two loops are provided as shown below:

$$C_1 = R_1, s_1, R_3, s_4, R_2, s_3, R_1$$

$$C_2 = R_2, s_4, R_3, s_2, R_4, s_5, R_2$$

and thus equation (10) is given below:

$$s_1 - s_3 + s_5 = 0$$

$$s_2 - s_4 + s_5 = 0 \quad (10)$$

and next, equation (10) is expressed in the form of matrix:

$$Bs = 0 \quad (11)$$

where $B =$ $$\begin{bmatrix} 1 & 0 & -1 & 1 & 0 \\ 0 & 1 & 0 & -1 & 1 \end{bmatrix} = [I \ C] \setminus I = \begin{bmatrix} 1 & 0 \\ 0 & 1 \end{bmatrix} \setminus C = \begin{bmatrix} -1 & 1 & 0 \\ 0 & -1 & 1 \end{bmatrix}.$$

Optimization of the Clock Skew

In this invention, there are two methods of optimization of the skew, a least-square error method and an interior-point method, being described below.

1. Least-Square Error Method

It is assumed that a circuit model has been built up, comprising r register(s) and p local data path(s), in which p>r, so there is/are p skew value(s) $S=[s_1 \ s_2 \ldots s_p]^t$ to be calculated. The number of register(s) is r, so only r−1 local data path is required to connect to all the registers, in which the r−1 local data path is called main skew and the other one (p−r+1) is called chord skew. Thus, S may be changed into $S=[S^c \ S^b]$, in which $S^c=[S_1 \ S_2 \ldots S_{p-r+1}]^t$ is chord skew and $s^h=[s_{p-r+2} \ldots s_p]^t$ is main skew. Each skew $s_i$ is corresponding to its safe range $s_i$ and an intermediate value in the safe range stands for ideal skew. Thus, a set of ideal p clock shift value $g=[g_1 \ g_2 \ldots g_p]^t$ is likewise given that is equal to $S=[s^c \ s^b]$, in which g may also be reduced to $g=[g^c \ g^h]$.

For the purpose, it is expected that the practical clock shift $\underline{S}=[s_1 \ s_2 \ldots s_p]^t$ is close to the ideal clock shift value $g=[g_1 \ g_2 \ldots g_p]^t$ as possible as it can. Thus, this issue is put into formula for the least-square error method:

$$\min \epsilon = \sum_{k=1}^{p} (s_k - g_k)^2 \quad (12)$$

where upper and lower limits are applied to each clock shift S and the clock shift S must meet the linear dependence proposed for the clock shift; thus, a limited condition of equation (12) is:

$$Bs = 0$$

$$l \leq s \leq u$$

equation (12) is expressed in the form of matrix:

$$\epsilon = (s-g)^2 = (s)^2 - 2g^t s + (g)^2 = s^t s - 2g^t s + g^t g$$

where $g^t g$ is a constant and $\tilde{\epsilon} = s^t s - 2g^t s$; thus, equation (12) is changed into:

$$\min \tilde{\epsilon} = s^t s - 2g^t s \quad (13)$$

condition limit: $Bs=0$ where the limited condition $l \leq s \leq u$ is temporarily neglected, and the upper and lower limits are not checked until the clock shift S is fully calculated.

Next, a method of quadratic equation of a conventional technology is used to calculate for a feasible solution to clock shift $S=[s^c \ s^b]$. At first, the Lagrange multiplier is introduced to equation (13) for a Lagrangean function (s, λ):

$$(s, \lambda) = \tilde{\epsilon} + \lambda^t Bs = s^t s - 2g^t s + \lambda^t Bs \quad (14)$$

$\tilde{\epsilon}$ is a fixed point in the Lagrangean function $\nabla(s, \lambda)=0$, so 0 is given from a first-order partial differentiation, namely $\nabla_s(s, \lambda)=0$ $\nabla_\lambda(s, \lambda)=0$.

From the above description, $$\nabla_\lambda(s, \lambda) = \nabla_\lambda(s^t s - 2g^t s + \lambda^t Bs) = Bs \Rightarrow \begin{vmatrix} 2s + B^t \lambda = 2g \\ Bs = 0 \end{vmatrix}$$

expressed in the form of matrix:

$$\begin{bmatrix} 2I_p & B^t \\ B & 0 \end{bmatrix} \begin{bmatrix} s \\ \lambda \end{bmatrix} = 2 \begin{bmatrix} g \\ 0 \end{bmatrix} \quad (15)$$

From equation (15), a second-row element B is eliminated in the Gaussian elimination method; namely, a first-row element is multiplied by $$\frac{1}{2} B$$

and then added to the second-row element for a result given below:

$$\begin{bmatrix} 2I_p & B^t \\ 0 & BB^t \end{bmatrix} \begin{bmatrix} s \\ \lambda \end{bmatrix} = 2 \begin{bmatrix} g \\ Bg \end{bmatrix} \quad (16)$$

From equation (16), two formulae may be given:

$$\lambda = 2M^{-1} Bg$$
$$s = -\frac{1}{2} B^t \lambda + g \quad (17)$$
$$\text{where } M = BB^t = [I \ C]\begin{bmatrix} I \\ C \end{bmatrix} = I + CC,$$

and if s and g are expressed as $s=[s^c \ s^b]$ and $g=[g^c \ g^b]$, then equation (17) may be changed into:

$$\lambda = 2M^{-1} Bg \quad (18)$$
$$s^b = -\frac{1}{2} C^t \lambda + g^b$$
$$s^c = -\frac{1}{2} \lambda + g^c$$

The values of vectors B and g in equation (13) are known and M is also a matrix given after being multiplied by B, so the practical clock shift $s=[s^c \ s^b]$ in the circuit may be given.

Interior-point Method as a Second Method

The interior-point method has been used to deal with the issue of optimization in recent years because a feasible solution to this problem in this method depending on quite a little times of iteration, and thus processing time is greatly improved. In this invention, a last experimental data is solved in the least-square error method.

2. Interior-point Method

Generally speaking, the interior-point method on the basis of a theory comprises three methods: Fiacco and McCormick logarithmical barrier function method that is used for solving the issue of optimization of an inequality condition, Lagrange's method that is used for solving the issue of optimization of an equality condition, and Newton's iteration method that is used for solving the issue of system of non-linear equations without any condition. The following original issue of interior-point method is considered:

$$\min \frac{1}{2} x^T Q x + c^T x \quad (19)$$
$$s.t. Ax = b$$
$$\underline{x} \le x \le \overline{x}$$

A quadratic-expression objective function, a threshold condition, an inequality threshold condition are included.

Figure 6:
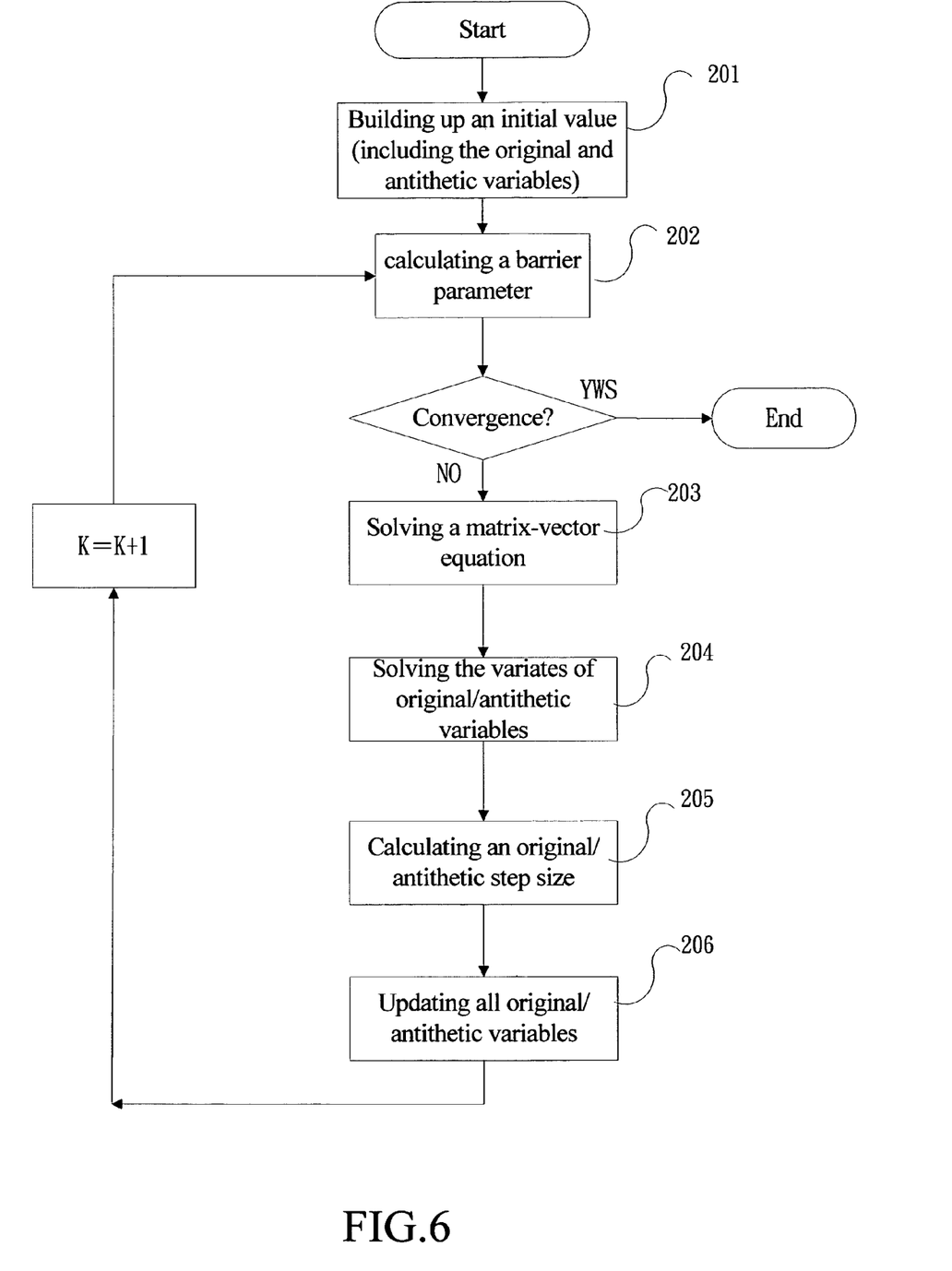
FIG. 6 is a flow chart of implementation of the Interior-point algorithm.

The logarithmical barrier function method is used mainly because a barrier parameter µ starts from a certain positive value as an initial value and is gradually close to 0. Theoretically, when being reduced to 0, the barrier parameter tends towards a minimum value of the original issue. The interior-point method comprises the following steps, as shown in FIG. 6.

At step 1 of building up an initial value 201, an initial value is built up, comprising an original variable and an antithetic variable.

At step 2 of calculating a barrier parameter 202, a barrier parameter is calculated, in which if a solution is convergence, the step ends, and if not, step 3 enters.

At step 3 of solving a matrix-vector equation 203, a matrix-vector equation is solved.

At step 4 of solving variates 204, the variates of an original variable and those of an antithetic variable are calculated.

At step 5 of calculating a step size 205, the step sizes of original and antithetic variables are calculated.

At step 6 of updating variables 206, all the original and antithetic variables are updated.

Employment of an Algorithm

After the issue of clock shift is put into the formula of quadratic equation, with a known value, the practical clock shift $\underline{s}=[\underline{s}^c \ \underline{s}^b]$ is calculated. Next, programming is performed, in which 4 important steps as follows must be specially researched.

1. Construction of a circuit model: in this invention, the clock shift value between the registers adjacent to each other in the digital VLSI circuit is mainly calculated. Thus, the circuit must be modeled and, as shown in FIG. 4C, a pure register-based circuit model is formed. In this invention, a Depth First Search Algorithm is used to form the structure.

2. Circuit loop search: in equation (11), from $\underline{B}s=0$, matrix $\underline{B}$ is just a loop of a circuit. Thus, the loops in the circuit must be found, and generally, a null space method may be used to find all the loops. From a testing result and an analysis, it is found that much time and many memories are required in this null space method, and thus it is replaced with Fundamental Loop and the concept of spanning tree is implemented.

3. Matrix multiplication: after the circuit loop search ends, the matrix $\underline{B}$ is given. Next, matrix multiplication is required for the matrix $\underline{M}=\underline{BB}^t$ in equation (17), so the concept of sparse matrix multiplication is used to save much time in operation.

4. Solution to the Ax=b issue: likewise, in equation (17), the Lagrange multiplier $\lambda=2\underline{M}^{-1}\underline{B}g$ must be calculated. The type of equation is like Ax=b as a mathematic issue, being solved in an inverse matrix method but inefficient. In this invention, the conjugate gradient algorithm is used, and from a testing result, it is found that this algorithm is effective and works fast.

Depth First Search Algorithm

When a circuit is read in, the interconnection of circuit must be built up. Thus, a next clock shift calculation may be carried out, so the circuit must be modeled. The clock shift is the difference of clocks between the registers adjacent to each other, so the circuit model must be formed into the register-based model. In this invention, the Depth First Search Algorithm is used to construct the circuit model, and a recursion method is used as a skill, indicating that the program call itself until no node. After the Depth First Search Algorithm is used in this invention to construct the circuit model, except registers, logic gates in the circuit will be recorded in the form of value, and the generated model is the type of registers connected to each other.

Spanning Tree

From the description above, before the clock shift is transformed into the quadratic equation, all the loops in the circuit must be searched, in which the loops are independent. Among the methods of searching all the loops, the null space method is widely used but inefficient. Thus, in this invention, at step 3 in FIG. 3, the spanning tree method is a substitute and works with the Depth First Search method to very efficiently form all the loops in the circuit. The loop sets are matrices B. After the matrix at step 4 shown in FIG. 3 is constructed, the quadratic equation programming may be executed. Steps of forming all the loops in the circuit in the spanning tree are described below.

Figure 7A:
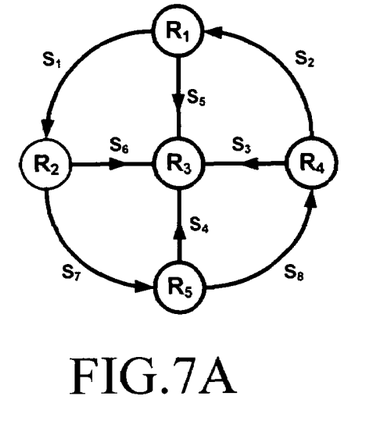
FIG. 7A is a exemplary view of a spanning tree for a circuit.
Figure 7B:
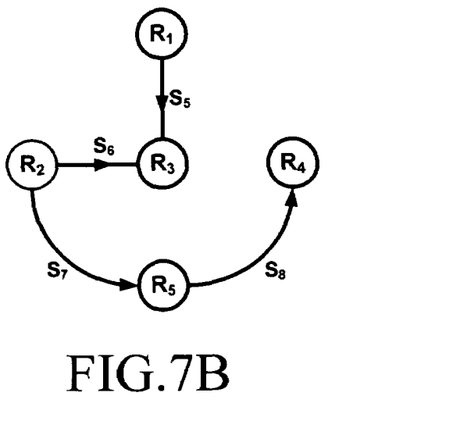
FIG. 7B is a view of a spanning tree.
Figure 7C:
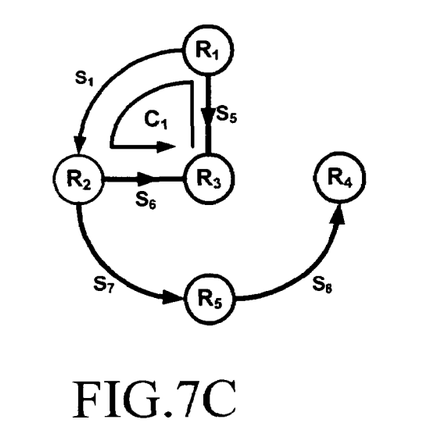
FIG. 7C is a view of a first loop of the spanning tree.
Figure 7D:
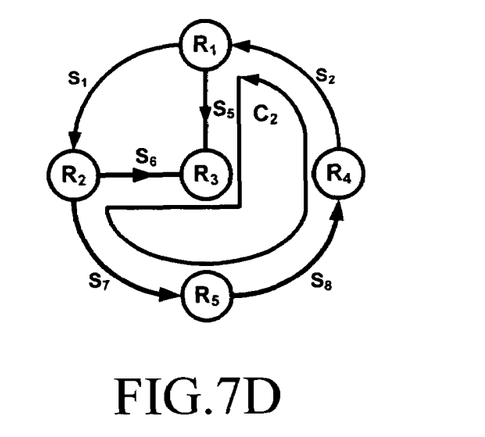
FIG. 7D is a view of a second loop of the spanning tree.
Figure 7E:
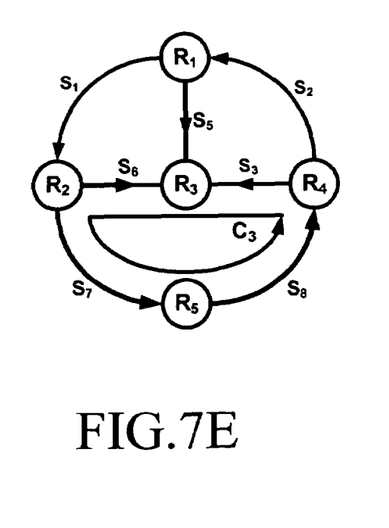
FIG. 7E is a view of a third loop of the spanning tree.
Figure 7F:
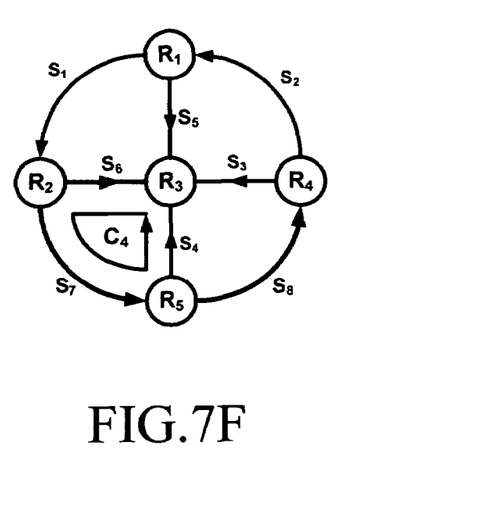
FIG. 7F is a view of a fourth loop of the spanning tree.

1. A simple example is given for explanation, as shown in FIG. 7A. This circuit comprises 5 registers and 8 connections (local data paths). First of all, minimum connections that link to all the registers are found. This circuit comprises 5 registers, so 4 connections link to all the registers. At this time, the spanning tree method is used. In this invention, the spanning tree is searched in the Depth First Search algorithm as an example for a next step of explanation.
2. In the exemplary circuit shown in FIG. 7A, the Depth First Search algorithm is used to find the spanning tree $R_1 \to s_5 \to R_3 \to s_6 \to R_2 \to s_1 \to R_5 \to s_8 R_4$, as shown in FIG. 7B.
3. Then, connection $s_1$ is linked and thus a first loop $C_1 = s_1 - s_5 + s_6$ is shown, as illustrated in FIG. 7C.
4. Connection $s_2$ is linked and thus a second loop $C_2 = s_1 + s_5 - s_6 - s_7 + s_8$ is found, as shown in FIG. 7D.
5. Connection $s_3$ is linked and thus a third loop $C_3 = s_3 - s_6 + s_7 + s_8$ is found, as shown in FIG. 7E.
6. Connection $s_4$ is linked and thus a fourth loop $C_4 = s_4 - s_6 + s_7$ is found, as shown in FIG. 7F.
7. After all the loops are done, a matrix B may be formed:

$$B = \begin{bmatrix} 1 & 0 & 0 & 0 & -1 & 1 & 0 & 0 \\ 0 & 1 & 0 & 0 & 1 & -1 & 1 & 1 \\ 0 & 0 & 1 & 0 & 0 & -1 & 1 & 1 \\ 0 & 0 & 0 & 1 & 0 & -1 & 1 & 0 \end{bmatrix} = [I\ C]$$

Sparse Matrix Multiplication

Matrix multiplication takes very much time and occupies more memory, so the complexity will reach $O(n^3)$, if two matrices are just multiplied in no skill, in which n is margin length of matrix; thus, Sparse Matrix Multiplication (proposed in year 1996 by G. H. Golub and C. F. V. Loan, *Matrix Computations*. Johns Hopkins University Press, Baltimore, proposed in year 2002 by F. Y. Chang, *A x=b in C++. sparse matrix technique*. NCTU press) is used at the step of this invention for time saving; the step is matrix $M=BB^t$, in which $B=[I\ C]$, and thus $$M = BB^t = [I\ C]\begin{bmatrix} I \\ C \end{bmatrix} = I + CC^t;$$

the model of unit matrix I is fixed, so only the matrix B is required to be saved and only $CC^t$ is acceptable given from the matrix M.

Although overwhelming majority of operation time and memory occupation is saved, because digital VLSI circuit interconnect is very complicated, the matrix multiplication $CC^t$ must still be improved. It is found in this invention that the matrix $CC^t$ is very sparse because most of the values are 0, and thus if all elements are stored and multiplied, more memory and time will be consumed and wasted. Thus, the concept of sparse matrix multiplication is available in this invention to record non-zero elements in the matrix $\underline{C}$, being described as follows:

1. Each non-zero element as a row vector is recorded sequentially.
2. Each non-zero element as a column vector is recorded sequentially.
3. Each non-zero element as a value is recorded sequentially.

Other zero elements are not recorded. As shown in FIG. 7E, non-zero elements in the matrices are indicated with *, and the matrices are multiplied by the non-zero elements; from a result given from the circuit under test, excellent improvement on time saving is made.

Conjugate Gradient Algorithm

After the clock shift is transformed into the quadratic equation, at step 105, in the conjugate gradient algorithm followed by a series of deduction processes and the Lagrange multiplier, equation (17) is given. In equation (17), the form of Lagrange multiplier $\lambda = 2\underline{M}^{-1}\underline{Bg}$ is like the mathematic issue of Ax=b, in which the matrix $\underline{M}$ is same as the matrix in Ax=b and the vector $\underline{Bg}$ is same as the vector b in Ax=b. In a current knowledge base, there are many kinds of solutions to the mathematic issue of Ax=b, and the matrix $\underline{M}$ is used as an inverse matrix, which is immediate but takes much more time. After consideration is taken for all aspects, the conjugate gradient algorithm is used to solve the mathematic issue of Ax=b.

The conjugate gradient algorithm is a renowned algorithm in scientific calculation, and the Krylov subspace iteration algorithm is developed from this algorithm. The conjugate gradient algorithm was proposed by Hestenes & Stiefel in 1952 at the earliest days. CG algorithm is used to solve a symmetrical system in positive definite form quite effectively, and in the method of iteration, several rows of direction vectors are generated to update an iteration solution and an remainder vector. Although the generated arrays becomes larger and larger, only a small number of vectors are stored. Thus, the iteration of the conjugate gradient algorithm is used in this invention to obtain the Lagrange multiplier $\lambda = 2\underline{M}^{-1}\underline{B}g$, in which when a residual error as a condition is small enough to stop the iteration, a set of operation result is generated. In the mathematic issue of Ax=b, the residual error is the sum of errors between a former set of x and a later set of x. Enough small residual error indicates that the value x obtained in the conjugate gradient algorithm almost approaches a correct value x, and thus the iteration stops.

Figure 11:
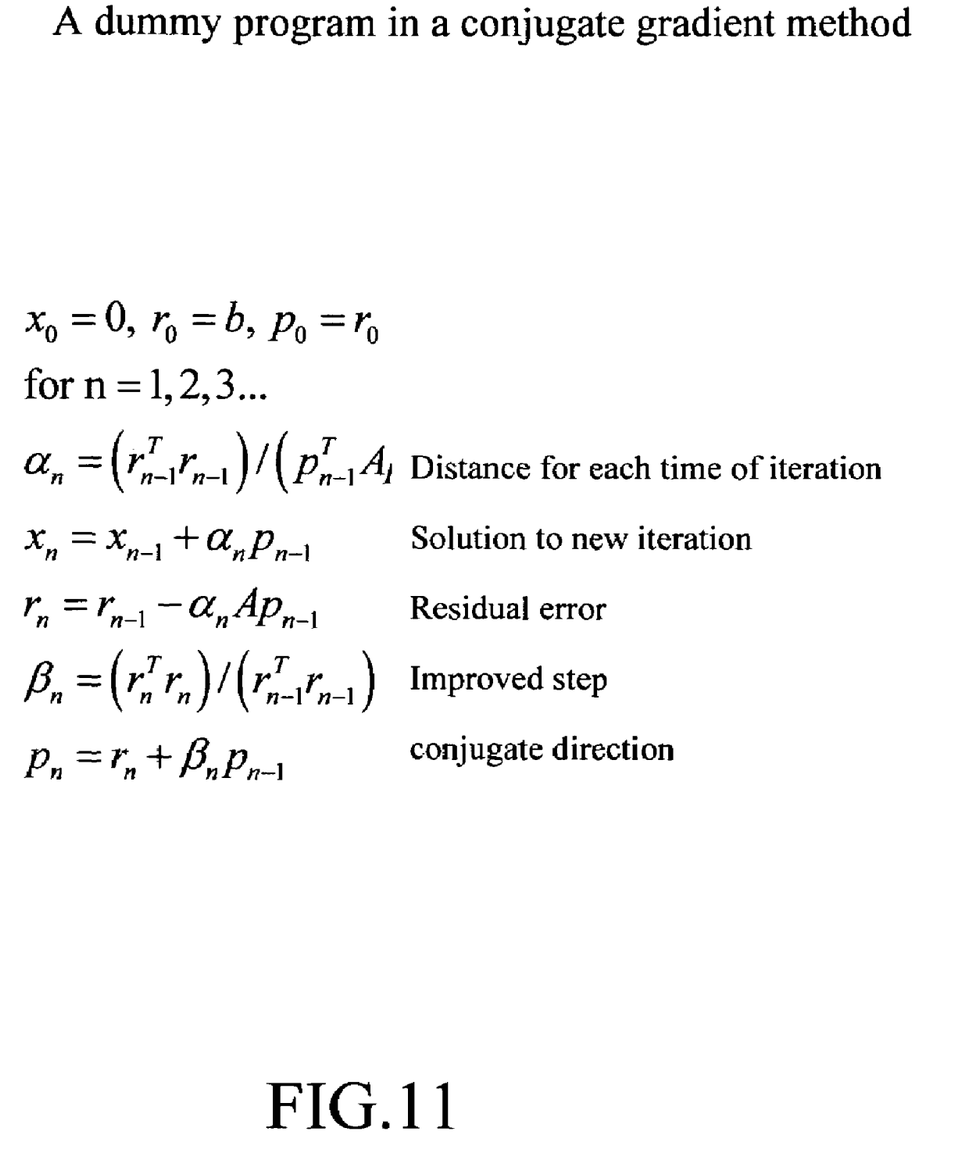
FIG. 11 gives a dummy program in a conjugate gradient method.

Basically, in the conjugate gradient algorithm, a conjugate direction is applied for the concept of search direction, and a proper value s, called a step size, after many times of iteration, is used for rapid convergence. FIG. 11 shows a dummy program. $\alpha_n$ is an approach distance for each time of iteration, $r_n$ is a residual error, a margin between a later solution $x_n$ and a former solution $x_{n-1}$ that are given after iteration, being used to determine whether the iteration stops; $P_n$ is a conjugate direction, an approach direction for each time of iteration.

Finally, at step 6 shown in FIG. 3, a value may be obtained in the conjugate gradient algorithm. After the algorithm is compared with other methods, it is found that it is precise. It is nevertheless especially noted that it saves much more time to operate, the residual error as the condition stops the iteration depending on a user's setting so that the user may set up for required precision and operating rate. At the same time, determination is made whether it meets the user's request at step 7 shown in FIG. 3. If it does, a result is outputted at step 9 shown in FIG. 3; if it does not, fine tune is done for an ideal skew at step 8 shown in FIG. 3. Next, steps 5, 6, and 7 shown in FIG. 3 are repeated until it meets the required conditions.

Simple Embodiments of This Invention

As shown in FIG. 3 illustrating a flow chart of a program, after the Lagrange multiplier $\lambda=2M^{-1}Bg$ is obtained in the conjugate gradient algorithm and then put in equation (17) for a feasible solution to the skew, before the program ends, determination is made whether all the skews meet Bs=0 and $1 \leq s \leq u$, and if it does, correction and calculation must continue. Fine tune is done for the ideal skew g and then calculation is made again for the feasible solution to the skew. After it meets the condition, the obtained feasible solutions to all the skews are outputted.

Fine Tune for Ideal Skew

If the obtained skew does not meet any threshold condition, then the skew s is out of the safe range. At this time, fine tune must be made for the ideal skew g. If the obtained skew s is higher than the upper bound of safe range, the ideal clock g is lowered; contrarily, if the obtained skew s is lower than the lower bound of safe range, the ideal clock g is heightened. The volume of ideal clock g is adjusted depending on the margin between the skew s and the boundary value of safe range, indicating when that the skew s is much far from the boundary value of safe range, larger adjustment of the ideal clock g is made; contrarily, when that the skew s is less far from the boundary value of safe range, smaller adjustment of the ideal clock g is made. Adjustment is thus made by degree until the obtained skew s meets the threshold condition, and the iteration stops.

Implementation Result

Operation platforms used in this invention are SUN Blade 2000 as a workstation, Solaris 8 as an operating system, Ansi C for design, and a gcc compiler. ISCAS'89 is applied as a testing circuit. A smaller circuit is herein used to generate an output file as an example after the operation is performed in this invention, and the output file contains the total amounts of circuit logic gates, the number of registers, the number of local data paths, clock periods, and feasible solutions to all the skews.

Line 1 indicates a circuit name, r, p, Spanning, Clock, CG#, Residual, and Run Time in lines 2~9 indicate the number of registers, the number of local data paths, the number of spanning tree nodes, clock period, number of times of iteration in the conjugate gradient algorithm, residual error, number of times for calculation of the skew s, and running time of the program, respectively, and line 9 indicates running time of the program in the conventional technology, in which * stands for the minimum.

Experimental Analysis

Figure 8A:
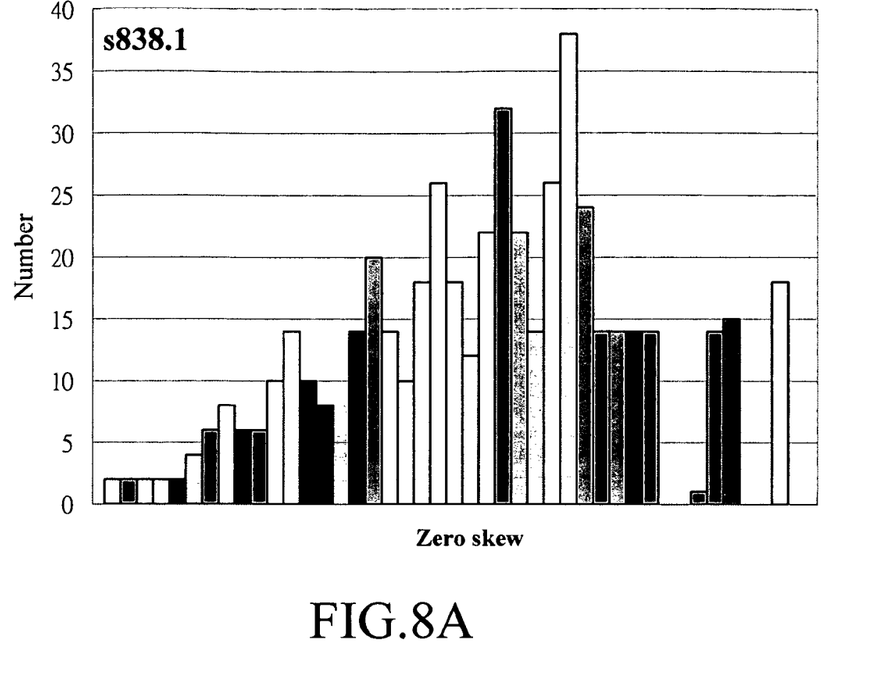
FIG. 8A is a view of a zero skew caused from the execution of a circuit S838.1.
Figure 8B:
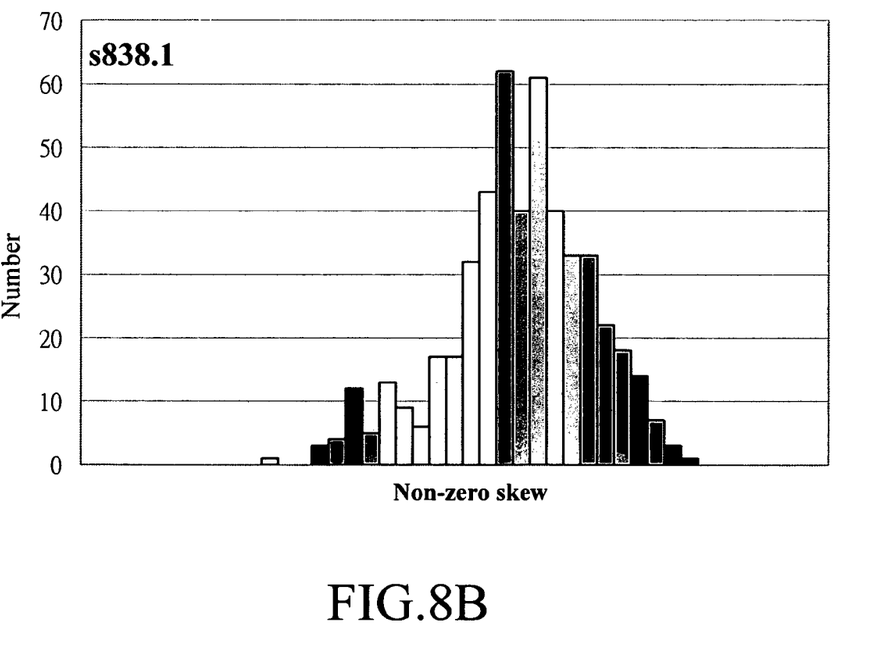
FIG. 8B is a view of a non-zero skew caused from the execution of the circuit S838.1.
Figure 9A:
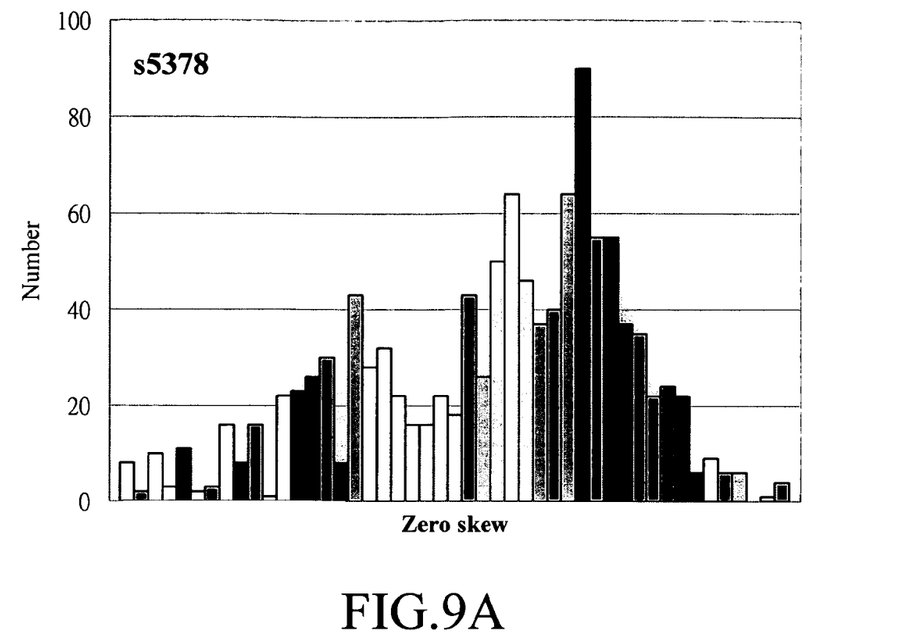
FIG. 9A is a view of a zero skew caused from the execution of a circuit S5378.
Figure 9B:
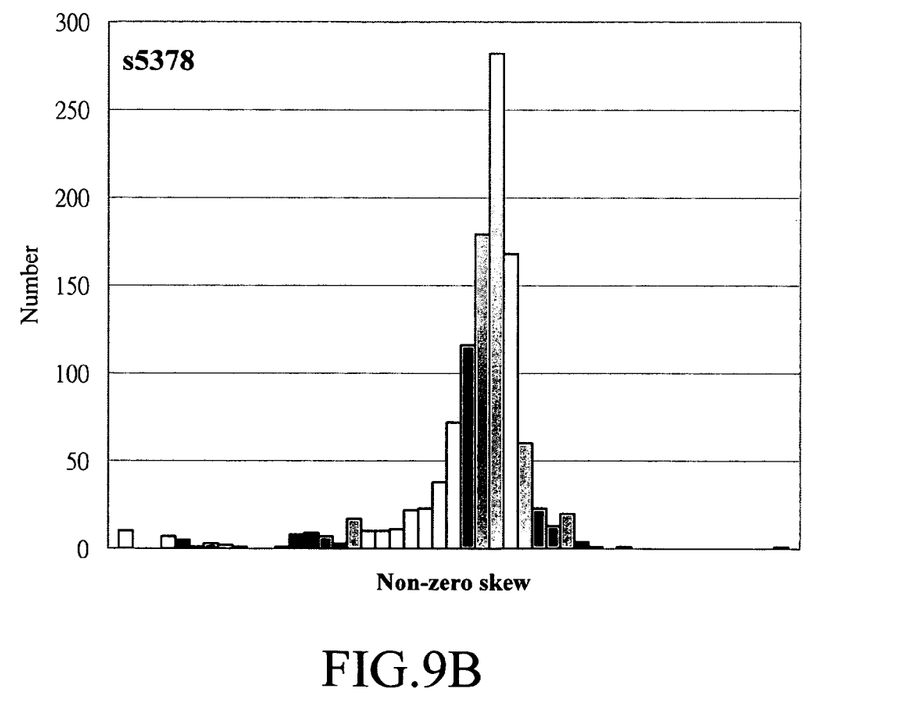
FIG. 9B is a view of a non-zero skew caused from the execution of the circuit S5378.
Figure 10:
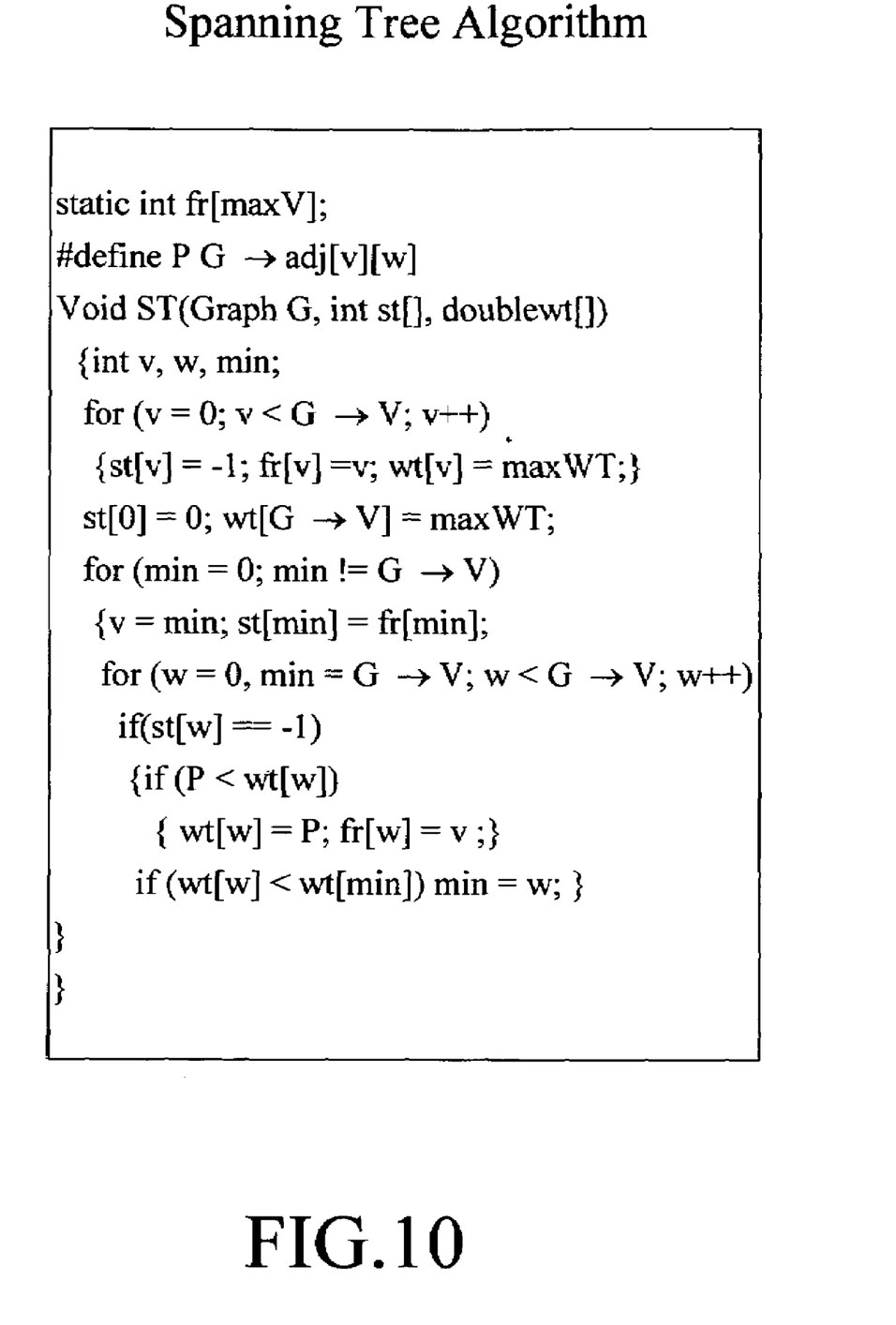
FIG. 10 gives a dummy program in a spanning tree algorithm.

Zero Skew is compared with Non-Zero Skew for the reliability of a circuit, two ISCAS'89 testing circuits, s838.1 and s5378, are determined to be examples, analysis results are shown in FIGS. 8A, 8B, 9A, and 9B, zero skews are shown in FIGS. 8A and 9A, and non-zero skews are shown in FIGS. 8B and 9B. In FIGS. 8A and 9A, it is apparent that when the skew is at 0, the distribution range is wide. Thus, being close to the boundary value of safe range, the zero skew might also be out of the boundary value of safe range, so it is not good to the reliability of circuit. On the contrary, in FIGS. 8B and 9B, the obtained feasible solutions to the skews in the safe range are obviously concentrated in the center, indicating that they are very close to the ideal skew; thus, the reliability and performance of circuit increase.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of designing a digital synchronous VLSI system established from a quadratic equation for Clock Skew scheduling and optimization comprising following steps:

(a) constructing a circuit model for the quadratic equation using a digital computer, utilizing the feature of circuit linear dependence and a minimum spanning tree that works with a Depth First Search algorithm to deduce the clock skew matrix;

$$C_1 = R_1, s_1, R_3, s_4, R_2, s_3, R_1$$
$$C_2 = R_2, s_4, R_3, s_2, R_4, R_3, R_2 \rightarrow B = \begin{bmatrix} 1 & 0 & -1 & 1 & 0 \\ 0 & 1 & 0 & -1 & 1 \end{bmatrix} = [I \ C]$$

wherein s=clock skew, R=Register, C=Circuit loop $$I = \begin{bmatrix} 1 & 0 \\ 0 & 1 \end{bmatrix}$$

$$C = \begin{bmatrix} -1 & 1 & 0 \\ 0 & -1 & 1 \end{bmatrix}$$

(b) executing "least square error" to optimize the produced clock skew matrix produced in 1 (a);

$$\min \varepsilon = \sum_{k=1}^{p} (s_k - g_k)^2 \rightarrow \min \tilde{\varepsilon} = s^t s - 2g^t s$$

Introducing the Lagrange Multipliers by utilizing the method of quadratic programming, and deduce the Lagrange function $\Lambda(s, \lambda)$ $$\Lambda(s,\lambda) = \tilde{\varepsilon} + \lambda^t Bs = s^t s - 2g^t s + \lambda^t Bs$$

$\tilde{\varepsilon}$ is a stationary point (fixed point) in the Lagrange function (s, $\lambda$), so 0 is given from a first-order partial differentiation, namely $\nabla(s, \lambda)=0$ $$\rightarrow s^t s - 2g^t s + \lambda^2 Bs = 0 = Bs \rightarrow \begin{vmatrix} 2s + B^t \lambda = 2g \\ Bs = 0 \end{vmatrix}$$

Presenting in a manner of matrix $$\rightarrow \begin{bmatrix} 2I_p & B^t \\ 0 & BB^t \end{bmatrix} \begin{bmatrix} s \\ \lambda \end{bmatrix} = 2 \begin{bmatrix} g \\ Bg \end{bmatrix} \rightarrow \begin{matrix} \lambda = 2M^{-1}Bg \\ s = -\frac{1}{2}B^t\lambda + g \end{matrix}$$

wherein $$M = BB^t = [I \ C]\begin{bmatrix} I \\ C \end{bmatrix} = I + CC$$

$B^t$=transpose matrix of B
s and g presented as S=[$S^c$ $S^b$] and g=[$g^c$ $g^h$], the deduction expression is $$\lambda = 2M^{-1}Bg$$
$$\rightarrow s^b = -\frac{1}{2}C^t\lambda + g^b$$
$$s^c = -\frac{1}{2}\lambda + g^c$$

Wherein g=optimal clock skew, s=calculated clock skew, $\lambda$ is the Lagrange Multipliers. And $S^c$=[$S_1$ $S_2$ ... $S_{p-r+1}$]$^t$ is chord clock skew, $S^b$=[$S_{p-r+2}$ ... $S_p$]$^t$ is main clock skew;
(c) calculating the Lagrange Multipliers with the use of high precision and calculating speed Conjugate Gradients Algorithm; Output a set of calculated results when the Residual Error is small enough to reach a stop condition of iteration;
(d) wherein the value of x computed by Conjugate Gradients Algorithm approaches the correct value of x;
(e) wherein the result of clock skew produced in (c) is the optimum clock skew amount for circuit working; and
(f) testing by ISCAS'89 benchmark.

2. A method of designing a digital synchronous VLSI system for Clock Skew scheduling and optimization according to claim 1, including constructing a minimum spanning tree that works with a Depth First Search algorithm to efficiently form a set of loops in the circuit, and wherein set of loops is a matrix B:

$$B = \begin{bmatrix} 1 & 0 & 0 & 0 & -1 & 1 & 0 & 0 \\ 0 & 1 & 0 & 0 & 1 & -1 & 1 & 1 \\ 0 & 0 & 1 & 0 & 0 & -1 & 1 & 1 \\ 0 & 0 & 0 & 1 & 0 & -1 & 1 & 0 \end{bmatrix} = [I \ C]$$

and wherein, after the matrix B is constructed, quadratic equation programming may be executed.

3. A method of designing a digital synchronous VLSI system for Clock Skcw scheduling and optimization according to claim 1, wherein the iteration of the conjugate gradient algorithm is used to obtain the Lagrange multiplier $\lambda$=2M$^{-1}$Bg, wherein when a residual error as a condition is small enough to stop the iteration, a set of operation result is generated; and wherein in the mathematic issue of Ax=b, the residual error is the sum of errors between a former set of x and a later set of x Ax=b; and small enough residual error indicates that the value x obtained in the conjugate gradient algorithm approaches a correct value x, and the iteration stops.

* * * * *